(12) United States Patent
Abe et al.

(10) Patent No.: US 6,879,119 B2
(45) Date of Patent: Apr. 12, 2005

(54) POSITIONING CONTROLLER

(75) Inventors: Hidefumi Abe, Tochigi-ken (JP);
Takaharu Sugawara, Tochigi-ken (JP);
Morihiro Yamada, Tochigi-ken (JP)

(73) Assignee: Keihin Corporation, Tokyo (JP)

( * ) Notice: Subject to any disclaimer, the term of this patent is extended or adjusted under 35 U.S.C. 154(b) by 75 days.

(21) Appl. No.: 10/628,408

(22) Filed: Jul. 29, 2003

(65) Prior Publication Data
US 2004/0046521 A1 Mar. 11, 2004

(30) Foreign Application Priority Data
Sep. 10, 2002 (JP) ........................................ 2002-263800

(51) Int. Cl.[7] .................................................. H02P 1/18
(52) U.S. Cl. .................... 318/254; 318/138; 318/439; 318/560; 318/466; 318/468
(58) Field of Search ................................ 318/138, 254, 318/439, 560, 466, 468

(56) References Cited

U.S. PATENT DOCUMENTS

| | | | |
|---|---|---|---|
| 4,969,137 A | * 11/1990 | Sugiyama et al. | 369/44.11 |
| 5,350,988 A | * 9/1994 | Le | 318/618 |
| 5,675,230 A | * 10/1997 | Dunfield | 318/772 |
| 5,850,277 A | * 12/1998 | Dang et al. | 352/214 |
| 5,959,956 A | * 9/1999 | Takishima | 720/607 |

FOREIGN PATENT DOCUMENTS

EP    1 026 068 A2    8/2000

OTHER PUBLICATIONS

WO 99/08374 A; Burton Anthony Water et al.; Feb. 18, 1999; abstract.

* cited by examiner

*Primary Examiner*—Rina Duda
(74) *Attorney, Agent, or Firm*—Westerman, Hattori, Daniels & Adrian, LLP

(57) ABSTRACT

A positioning controller includes a gear mechanism having a rotating gear for positioning a movable member, a brushless motor to drive the rotating gear, and a motor control circuit to rotate a rotor of the brushless motor by sequentially supplying a driving pulse to a plurality of fixed coils of the brushless motor. The motor control circuit includes a present stage number detector to detect a present stage number of the movable member in accordance with an output signal from a magneto-sensitive device of the brushless motor, and a driving pulse generator to generate a driving pulse to rotate the rotor until a target stage number converted from a specified position of the movable member is equal to the present stage number. The controller in an apparatus including a motor driving unit allows positioning of the movable member without using a component for the detection of the position of the movable member.

16 Claims, 5 Drawing Sheets

POSITIONING CONTROLLER

BACKGROUND OF THE INVENTION

1) Field of the Invention

The present invention relates to a positioning controller for positioning a movable member such as a gear ratio determining member which determines a gear ratio of an automatic transmission mounted on an automobile or the like.

2) Description of the Related Art

In an apparatus used for positioning a movable member, such as a positioning table of a machine tool for a work piece, the movable member such as a nut in mesh with an elongated bolt is generally actuated by transmitting a turning force generated by a motor to the bolt through a gear attached thereto, thereby allowing the nut to travel along an axial direction of the bolt.

A positioning control or a coordinate control of the nut toward the target position can be performed, for example, by way of a feedback control which controls the required number of rotations of the motor by detecting a present position of the nut from an output signal of an encoder provided on a driving source, i.e., the motor.

Alternatively, the control can be performed by way of a feedback control which controls the required number of rotations of the motor by detecting the position of the nut from the angle of a member such as a sloped board which is mechanically linked to the movable nut, and such angle is detected by an angle sensor.

Those conventional control methods require a detecting sensor, in addition to a control unit such as a computer, to detect the present position of the nut in order to determine the difference between the present position and the target position of the nut, or set point, which results in an increase in overall system cost.

SUMMARY OF THE INVENTION

An object of the present invention is to provide a positioning controller in an apparatus including a motor driving unit, which can position the movable member without using a component for the positional detection of the movable member.

A positioning controller according to the present invention includes a gear mechanism having a rotating gear for positioning a movable member, a brushless motor to drive the rotating gear, and a motor control circuit to rotate a rotor of the brushless motor by sequentially supplying a driving pulse to a plurality of fixed coils of the brushless motor, wherein the motor control circuit includes present stage number detecting means to detect a present stage number of the movable member in accordance with an output signal from a magneto-sensitive device of the brushless motor, and driving pulse generating means to generate a driving pulse to rotate the rotor until a target stage number converted from a specified position of the movable member is equal to the present stage number.

DETAILED DESCRIPTION OF THE INVENTION

Embodiments of the present invention will be hereinafter described with reference to the attached drawings.

Figure 1:
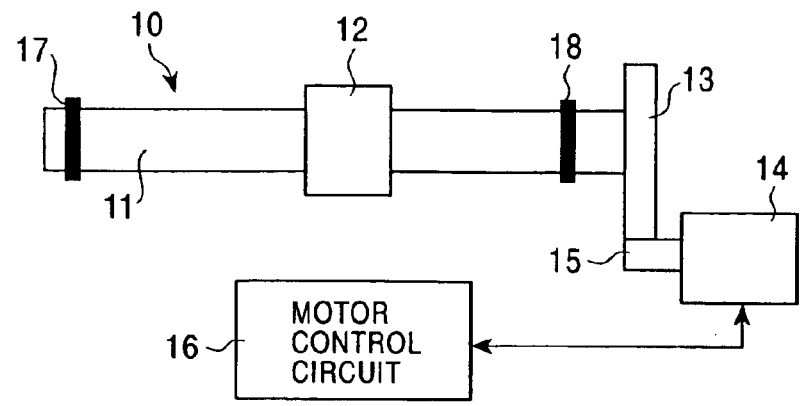
FIG. 1 is a schematic diagram of a positioning controller according to one embodiment of the present invention.

FIG. 1 shows a positioning controller 10 according to an embodiment of the present invention. The positioning controller 10 includes a bolt member 11. A nut member 12 adapted to mesh with the bolt member 11 is connected with a movable member. (not shown) such as a gear ratio determining member, which is provided in an automatic transmission mounted on an automobile. A flat gear 13 is fixed on one end of the bolt member 11, so as to mesh with a gear 15 that is combined with a rotating shaft of a motor 14. Accordingly, a turning force of the motor 14 is transmitted to the bolt member 11. A motor control circuit 16 is provided to supply a driving pulse signal to the motor 14. Positioning stoppers 17 and 18 adapted to engage with the bolt member 11 define a movable range of the nut member 12.

Figure 2:
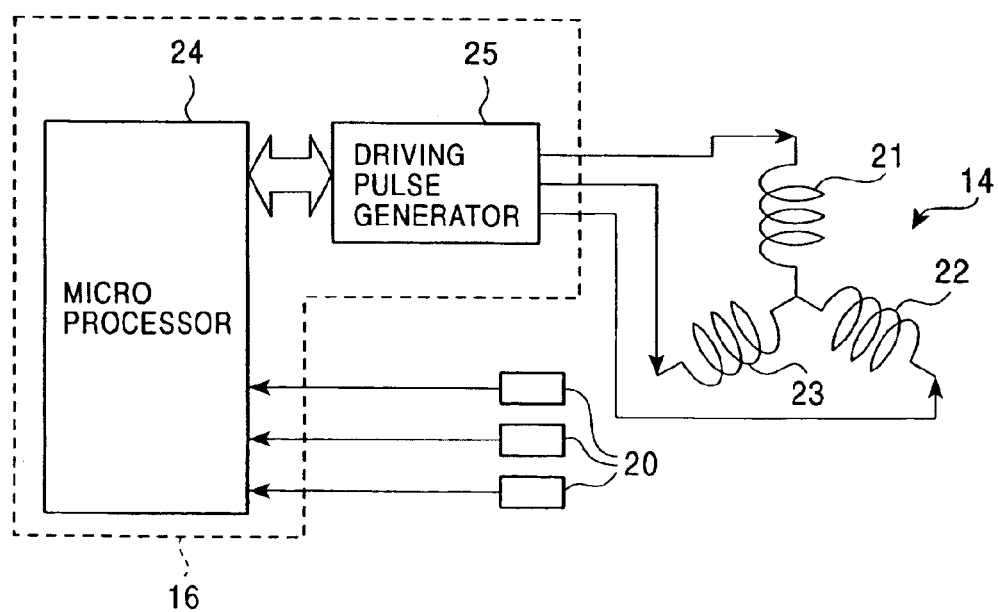
FIG. 2 is a detail view of a motor control circuit shown in FIG. 1.

FIG. 2 shows a detail view of the motor control circuit 16 shown in FIG. 1 and the motor 14 with the relationship therebetween. The motor 14 is a 3-phase brushless motor with a 2-pole rotor therein (not shown), and the motor has three magneto-sensitive devices 20 which respectively output an information of an angular position of the rotor. A U-phase coil 21, a V-phase coil 22 and a W-phase coil 23 which generate an electromagnetic force to rotate the rotor are provided on a stator (not shown) of the motor 14. In the embodiment, three magneto-sensitive devices 20 such as hall sensors are provided around the rotor at intervals of 120 degrees with respect to each other. The motor control circuit 16 includes a micro processor 24 and a driving pulse generator 25. The micro processor 24 receives positional signals from the magneto-sensitive devices 20, and outputs a rotating command to rotate the rotor in a normal direction or a reverse direction, or a stop command to stop the rotor, to the driving pulse generator 25 via a data line. The driving pulse generator 25 supplies driving pulses to each of the phase coils 21–23, in accordance with the timing of a control pattern, so that the rotor rotates in the normal direction or the reverse direction depending on the type of a command supplied from the micro processor 24.

Figure 3:
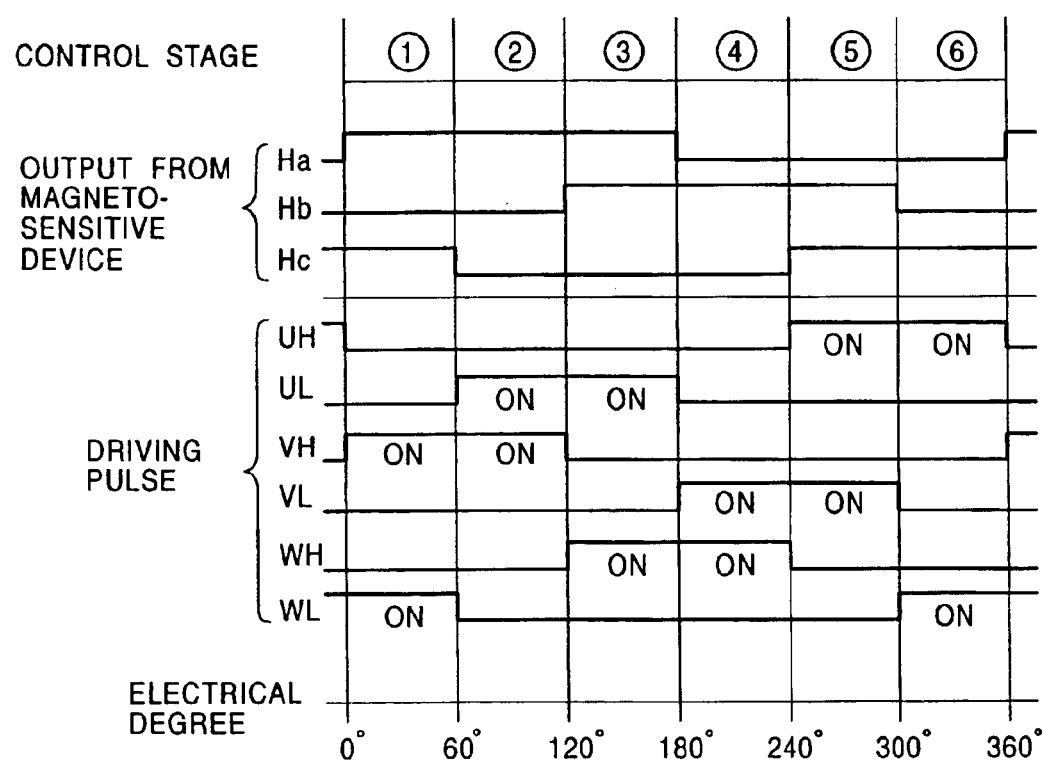
FIG. 3 is a control pattern of motor coils of the motor control circuit shown in FIG. 1.

FIG. 3 shows the control pattern for each of the phase coils. It should be noted that input signals from three magneto-sensitive devices are Ha, Hb and Hc, and driving pulses supplied to three phase coils are UH, UL, VH, VL, WH and WL. Two types of output signals are supplied to each phase coil of the motor as described above, that is, driving pulses supplied to apply a turning force over one side of the rotor (N-pole, for example) is defined as high side pulses (UH, VH and WH), whereas driving pulses supplied to apply a turning force over the other side of the rotor (S-pole, for example) is defined as low side pulses (UL, VL and WL).

As can be understood by FIG. 3, input signals Ha, Hb and Hc from the magneto-sensitive devices each having a pulse width of 180 degrees cooperatively generate a phase shift of 120 degrees. This is because three magneto-sensitive devices are provided around the rotor shaft at intervals of 120 degrees with respect to each other. As a result of the combination of three pulse signals, six control stages are defined as shown in FIG. 3. In response to the six control stages, six motor driving pulses UH-WL are applied to the phase coils 21, 22 and 23. The high side signal and the low side signal each having a pulse width of 120 degrees are in turn applied to each of the phase coils with a resting intervals of 60 degrees in between. Specifically, a series of high side condition, resting condition, low side condition and resting condition are repeated in each of the phase coils.

When the control stage is progressed from the stage number 1 to the stage number 6 as shown in FIG. 3, the rotor of the motor 14 turns through 360 degrees. When the stage number 6 is over, the control stage returns to the stage number 1 again. When a series of stages starting from 1 through 6 are repeated four times, the rotor of the motor rotates 24 stages, which corresponds to a 10 mm movement of the nut member 12 along an axial direction of the bolt member 11. Accordingly, a moving direction and a moving distance (stroke) of the nut member 12 can be controlled by supplying the driving pulses to the coils 21–23 of the motor 14 in accordance with the control pattern, that allows the rotor to turn through an angle corresponding to the specified number of stages in the normal direction or the reverse direction. The moving direction of the nut 12 can be reversed by supplying the driving pulses in accordance with the pattern designed to progress the stage number inversely, which allows the rotor to rotate reversely.

Figure 4:
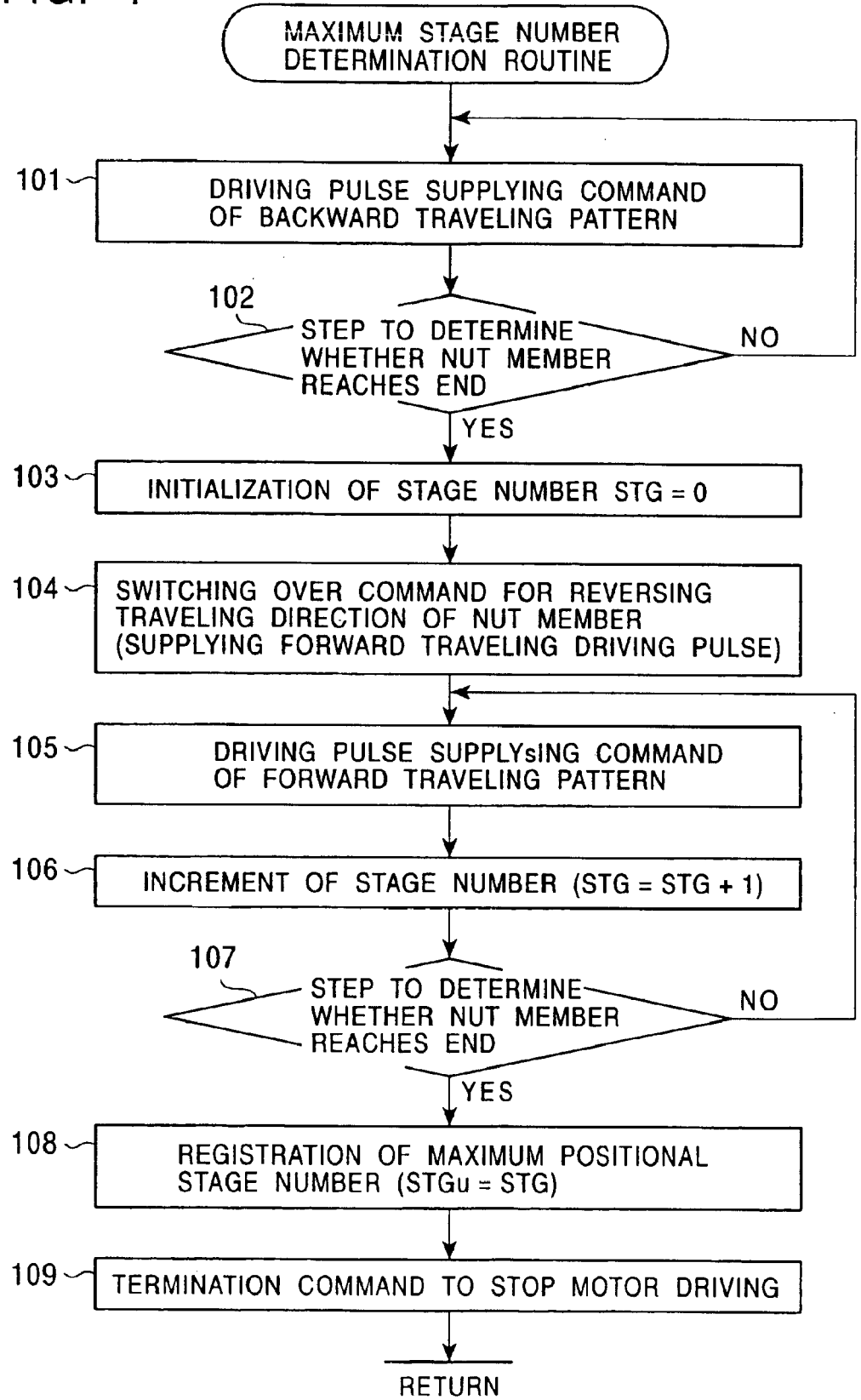
FIG. 4 is a flow chart showing a determination routine of a maximum stage number of the motor control circuit shown in FIG. 1.
Figure 5:
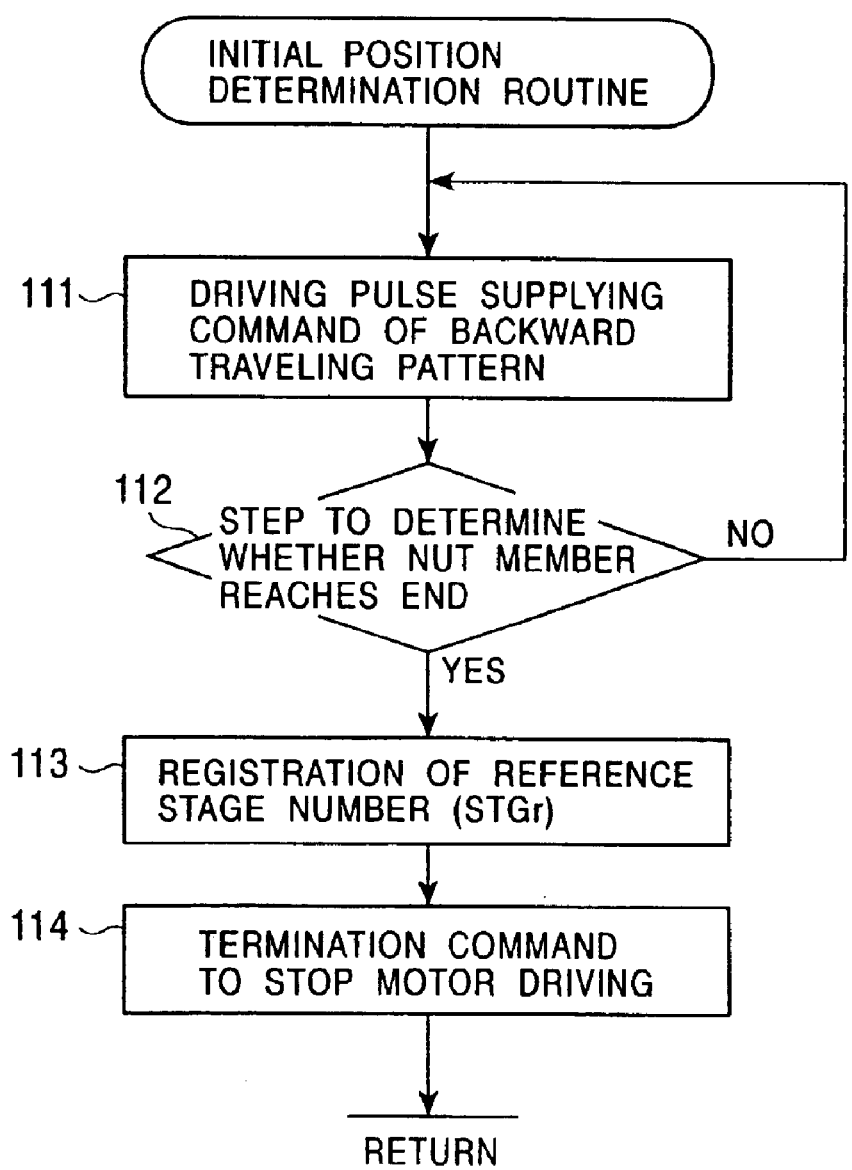
FIG. 5 is a flow chart showing a determination routine of an initial position of the motor control circuit shown in FIG. 1.
Figure 6:
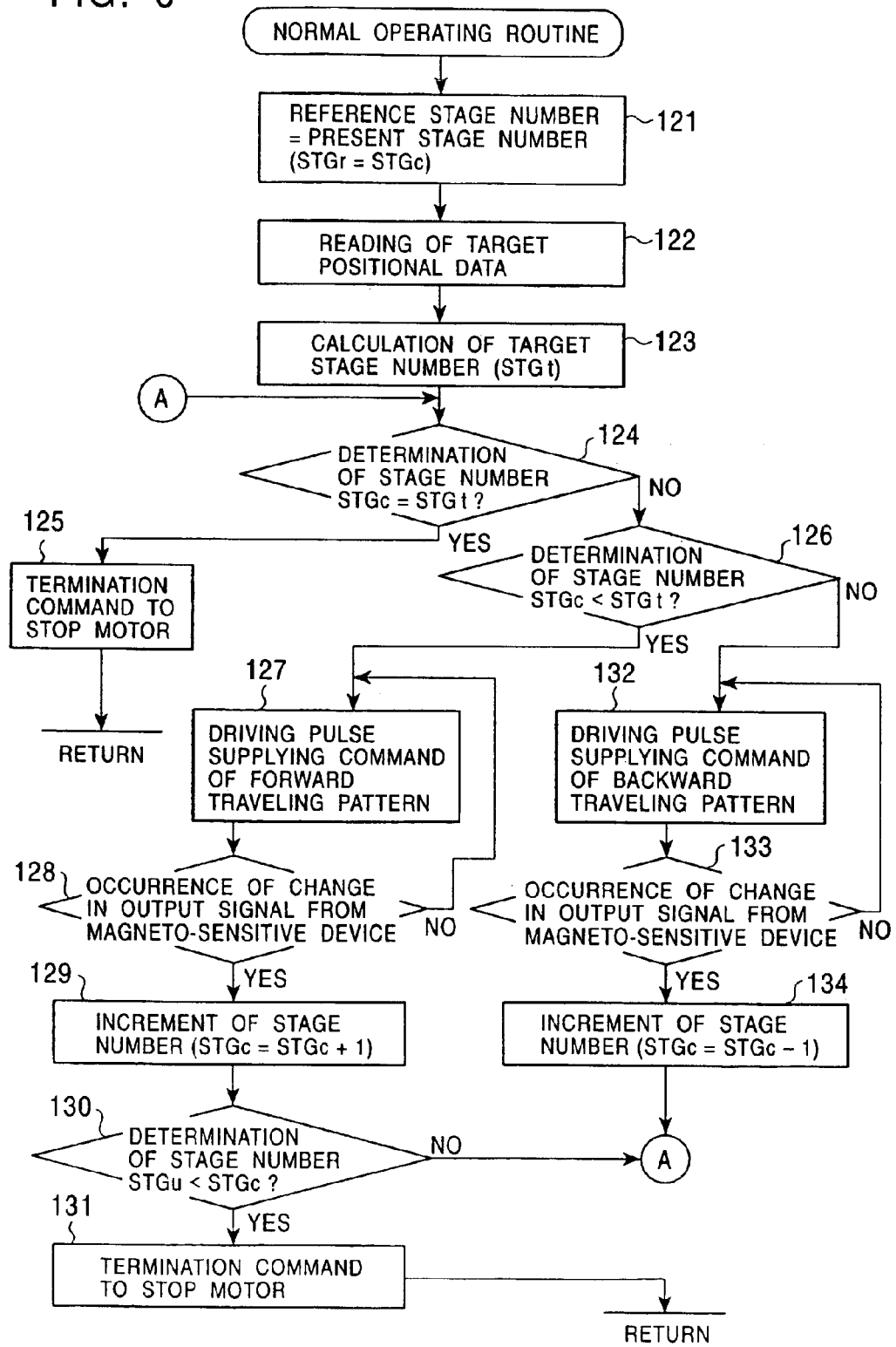
FIG. 6 is a flow chart showing a normal operating routine of the motor control circuit shown in FIG. 1.

FIGS. 4–6 show routines which are performed by the micro processor 24.

FIG. 4 shows a determination routine to determine a maximum stage number of the positioning controller according to the present embodiment, which may be performed just before the factory shipment. According to the routine, a driving pulse supplying command is firstly issued in accordance with a backward traveling pattern (step 101). It should be noted that the traveling direction of the nut member 12 is defined as forward when the stage number during travel is increased, whereas the direction is defined as backward when it is decreased. Then, the routine proceeds to a determination step which performs a determination whether the nut member 12 reaches one end of the bolt member 11, by detecting the change of the output signals from the magneto-sensitive devices 20 (step 102). Until the nut member 12 reaches the end of the bolt, a signal from the magneto-sensitive devices 20 keeps changing as shown in FIG. 3, which keeps issuing the command in step 101 repeatedly. When the nut member 12 reaches the end of the bolt, the supplying of the driving pulse is stopped, and the routine proceeds to a next step. In this step, an STG variable corresponding to a temporary stage number is set to zero (step 103). Then, the driving pulse pattern is switched over to a forward traveling pattern, so as to reverse the traveling direction of the nut member 12 (step 104). Then, a loop repeats itself to actuate the nut member 12 until the nut member 12 reaches the other end (steps 105–107). During the loop, the stage number of the driving pulse shown in FIG. 3 increments (step 106). When the nut member 12 reaches the other end, the stage number is registered as an STGu variable, which denotes a maximum positional stage number of the nut member 12 (step 108). A series of the steps described above allows registering an information of a full stroke distance of the positioning controller into a memory of the micro processor 24 as a difference between the temporary stage number set in step 103 and the maximum positional stage number or an incremented value. A series of the steps for determining the maximum stage number STGu may be skipped, once the number is registered in the memory such as a nonvolatile memory (not shown).

FIG. 5 shows a determination routine for an initial position which is performed by the micro processor 24 when the positioning controller according to the present embodiment is in practical use. The determination routine for an initial position determines a forward stroke limit or a backward stroke limit within the movable range of the nut member 12, which is defined as a starting datum (zero position). According to the routine, a driving pulse supplying command is firstly issued to move the nut member 12 in a backward direction (step 111). Then, the routine proceeds to a determination step to determine whether the nut member 12 reaches one end, by detecting the change of the output signals from the magneto-sensitive devices 20. Thereafter, step 111 is repeated to actuate-he nut member 12 until the nut member 12 reaches the end (steps 112). When the nut member 12 reaches the end, the STGr variable is registered as a datum position, which denotes a reference stage number of the nut member 12.

FIG. 6 shows a normal operating routine which is performed by the micro processor 24 when the positioning controller according to the present invention is in practical use. According to the routine, the positioning control of the nut member 12 can be realized by simply inputting a data of a required position of the nut member 12, because the datum position is already determined by the determination routine shown in FIG. 5. Firstly, the reference stage number registered is read as an STGc variable, which denotes a present stage number (step 121). Then, a data of a required position (coordinate) or an actual distance to be traveled by the nut member is input to the micro processor 24 (step 122). Based on the input data, a target stage number is calculated from a target position or a distance up to the target position. The target stage number is registered as STGt variable (step 123).

Subsequently, the routine determines whether the present stage number is equal to the target stage number (step 124). When the present stage number is equal to the target stage number (STGt=STGc), a command is issued to stop the motor without further actuating the nut member 12 (step 125). The control routine is terminated.

When the present stage number is not equal to the target stage number, the micro processor 24 compares the stage numbers with each other to determine which number is bigger so that the controller can perform different operations depending on the result of the comparison. When the present stage number is smaller than the target stage number (STGc<STGt) (step 126), a driving pulse supplying command is issued in accordance with the forward traveling pattern (step 127). Thereafter, the micro processor detects the change of the output signals from the magneto-sensitive devices 20. The same driving pulse is kept issuing until the stage is finished (step 128). Then, the stage number increments (step 129). Thereafter, STGc is compared with STGu (step 130). The step 130 is provided to cope with the situation when the target position is input beyond the stroke limit. According to the step, when the present stage number is bigger than the maximum stage number that is registered during the initialization (STGu<STGc), the control routine terminates (step 131). On the other hand, when the present stage number is smaller than the maximum stage number, the routine proceeds to a step labeled with A, and then the routine returns to the step 124. When the present stage number reaches the target stage number, after repeating abovementioned steps, the routine proceeds to the step 125 to terminate the control routine.

When the present stage number is bigger than the target stage number (STGc>STGt), a pulse supplying command of a driving pulse is issued in accordance with the backward travelling pattern that is reversed from that of step 128 (step 132). Then, similar to the step 128, the micro processor detects the change of the output signals from the magneto-sensitive devices 20, and the same driving pulse is kept issuing repeatedly until the stage is finished (step 133). Then, the stage number increments. It should be noted that unlike step 129, the stage number in step 134 is decreased by subtracting one from the stage number, in response to the driving pulses applied in one stage (step 134). Then, the routine proceeds to the step labeled with A, and returns to the step 124. A series of loop repeats itself until the present stage number reaches, the target stage number. When the present stage number is equal to the target stage number, the routine proceeds to the step 125 to terminate the control routine.

The positioning control of the movable member can be performed by the aforementioned control steps for an apparatus including a motor driving unit without using a special component for the detection of the position of the nut member or the movable member connected therewith. Specifically, because the full stroke distance is registered as a stage number or an incremented value during the initialization setting process, the position of the movable member can be identified only by registering the initial position. Furthermore, the actuation of the movable member to the specified position can be controlled only by inputting the target position or the travelling distance of the movable member.

What is claimed is:

1. A positioning controller comprising:
   a gear mechanism including a rotating gear for positioning a movable member;
   a brushless motor to drive the rotating gear; and
   a motor control circuit to rotate a rotor of the brushless motor by sequentially supplying a driving pulse to a plurality of fixed coils of the brushless motor;
   wherein the motor control circuit comprises:
   present stage number detecting means to detect a present stage number of the movable member in accordance with an output signal from a magneto-sensitive device of the brushless motor, and
   driving pulse generating means to generate the driving pulse to rotate the rotor until a target stage number converted from a specified position of the movable member is equal to the present stage number.

2. The positioning controller according to claim 1, wherein the driving pulse generating means has initialization means to detect a stroke limit stage number in advance which corresponds to at least one of a forward traveling limit or a backward travelling limit within a movable range of the movable member, and driving stop means to stop generating the driving pulse when the present stage number surpasses the stroke limit stage number.

3. The positioning controller according to claim 2, wherein the present stage number detecting means sets the stroke limit stage number as a datum position used for calculating the present stage number.

4. The positioning controller according to claim 1, wherein the gear mechanism has at least one stopper to define a movable range of the movable member, and the driving pulse generating means has datum position setting means to detect a forward traveling limit or a backward traveling limit within the movable range, such that the present stage number detecting means sets the forward traveling limit or the backward traveling limit as a datum position used for calculating the present stage number.

5. The positioning controller according to claim 1, wherein the magneto-sensitive device is a hall sensor.

6. The positioning controller according to claim 1, wherein at least three magneto-sensitive device are provided around the brushless motor.

7. The positioning controller according to claim 1, wherein the movable member is a gear ratio determining member of an automatic transmission of a vehicle.

8. The positioning controller according to claim 1, wherein the stage number increments when the rotor turns through 60 degrees.

9. A positioning controller comprising:
   a gear mechanism including a rotating gear for positioning a movable member;
   a brushless motor to drive the rotating gear; and
   a motor control circuit to rotate a rotor of the brushless motor by sequentially supplying a driving pulse to a plurality of fixed coils of the brushless motor;
   wherein the motor control circuit comprises:
   a present stage number detector to detect a present stage number of the movable member in accordance with an output signal from a magneto-sensitive device of the brushless motor, and
   a driving pulse generator to generate the driving pulse to rotate the rotor until a target stage number converted from a specified position of the movable member is equal to the present stage number.

10. The positioning controller according to claim 9, wherein the driving pulse generator has an initialiser to detect a stroke limit stage number in advance which corresponds to at least one of a forward traveling limit or a backward travelling limit within a movable range of the movable member, and a driving stopper to stop generating the driving pulse when the present stage number surpasses the stroke limit stage number.

11. The positioning controller according to claim 10, wherein the present stage number detector sets the stroke limit stage number as a datum position used for calculating the present stage number.

12. The positioning controller according to claim 9, wherein the gear mechanism has at least one stopper to define a movable range of the movable member, and the driving pulse generator has a datum position setter to detect a forward traveling limit or a backward traveling limit within the movable range, such that the present stage number detector sets the forward traveling limit or the backward traveling limit as a datum position used for calculating the present stage number.

13. The positioning controller according to claim 9, wherein the magneto-sensitive device is a hall sensor.

14. The positioning controller according to claim 9, wherein at least three magneto-sensitive device are provided around the brushless motor.

15. The positioning controller according to claim 9, wherein the movable member is a gear ratio determining member of an automatic transmission of a vehicle.

16. The positioning controller according to claim 9, wherein the stage number increments when the rotor turns through 60 degrees.

* * * * *